May 31, 1938.  T. J. STUMP  2,119,449
BRIER AND WEED HOOK
Filed Nov. 28, 1936
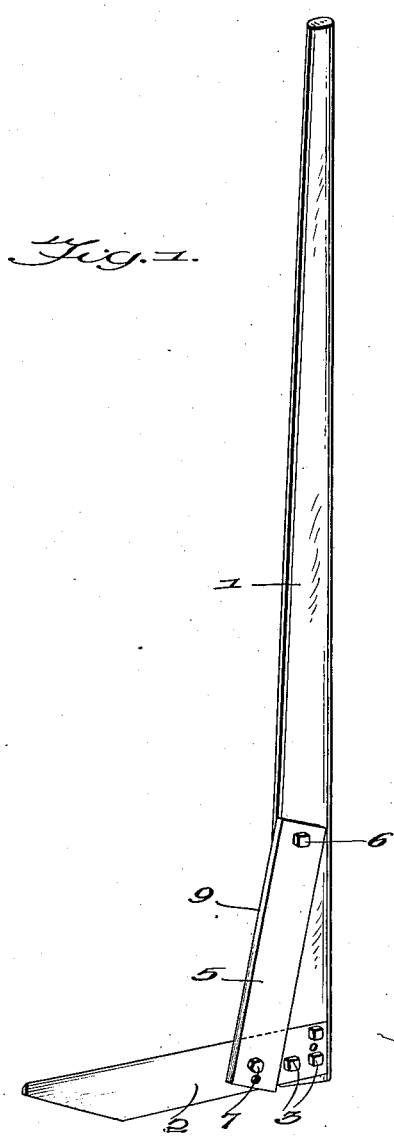
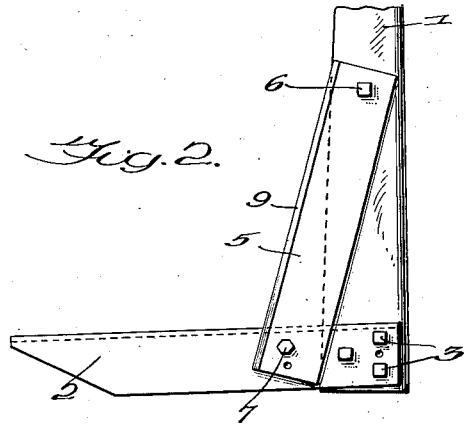
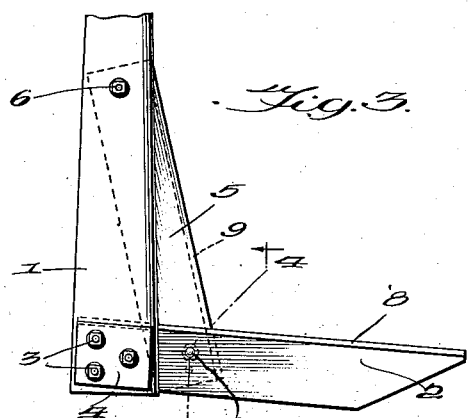
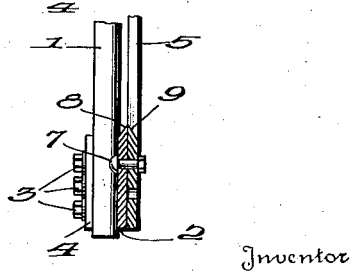
Inventor
Thomas J. Stump
By Cyrus Kehr & Swecker
his Attorneys Patented May 31, 1938

2,119,449

UNITED STATES PATENT OFFICE 2,119,449

BRIER AND WEED HOOK

Thomas J. Stump, Ashland City, Tenn.

Application November 28, 1936, Serial No. 113,214

3 Claims. (Cl. 30—318)

This invention relates to an improvement in brier and weed hooks intended for cutting heavy weeds and briers, and is adapted to be used in place of the common scythe.

In using the common scythe for cutting heavy weeds and briers, the cutting motion is in a swinging half circle, and if the heavy weeds and briers are hard and tough, they will slide along the edge of the scythe to the handle and stop the stroke without being cut. It is very difficult to cut such weeds and briers by means of the scythe because it has only one long blade and no upright blade.

The object of this invention is to provide a cutter with blades set at an angle to each other, so that if the weeds and briers slide along the main cutting blade, they will strike the upright blade and be cut off by it.

The upright blade is separate from the main cutting blade so that these may be formed from an ordinary strip of steel, or the like, without requiring expensive shaping as would be necessary if they were formed in one piece, thus reducing the cost of manufacture. At the same time, the auxiliary blade is connected between the main blade and the handle, so as to form a brace for the main blade, and being arranged at an obtuse angle to the main blade; this facilitates the sliding of the weeds and briers from the main blade to the auxiliary blade for cutting thereby.

A preferred embodiment of this invention is illustrated in the accompanying drawing, in which:

Fig. 1 is a perspective view of the complete cutter;

Fig. 2 is a side elevation of one side of the cutter with the handle broken away;

Fig. 3 is a similar view of the opposite side of the cutter; and

Fig. 4 is a transverse sectional view through the blades, substantially on the line 4—4 of Fig. 3.

The cutter is provided with a long handle 1, which is preferably formed straight, as shown in Fig. 1, in order to facilitate the handling of the cutter, although suitable hand-holds may be provided thereon, if desired. The handle 1 has a main cutting blade 2, rigidly attached to one end thereof, by bolts 3 passing through the blade 2 and through the end of the handle. On the opposite side of the handle from the blade 2 is provided a plate 4 through which the bolts 3 extend, in order to strengthen the handle at the point of connection with the blade.

An auxiliary or upright blade 5 is bolted at 6 to the handle 1 and extends therefrom to the back portion of the blade 2, to which the blade 5 is rigidly fastened by means of a rivet or bolt 7, substantially in the relation shown in the drawing, in which the auxiliary cutter 5 extends approximately diagonally from the handle 1 to the blade 2, which latter are arranged at an obtuse angle to each other of approximately 100° to 105°, and the auxiliary blade 5 is at an obtuse angle to the blade 2 and extends upwardly therefrom to receive the heavy weeds and briers which may not be cut by the horizontal blade 2, but will be deflected onto the blade 5 for cutting thereby in the normal sweeping motion of the cutter when used in the general manner of using a scythe. The angle of the blades 2 and 5 is such that upon a one-half or one-fourth circle stroke, the weeds or briers will slide against the edges of the two sharp blades, which gives a generally shearing cut rather than by striking the weeds squarely.

It will be noted that the cutting edges of the blades 2 and 5 are beveled off as at 8 and 9, respectively, so as to bring these cutting edges substantially into line, as shown in Fig. 4, which facilitates the passing of the weeds and briers from one cutter to the other and the cutting action of the blades.

The angular relation of the auxiliary or upright blade 5 with respect to the blade 2 and handle 1, also serves to brace and reinforce the blade 2 to prevent breaking thereof, and to maintain its relation with respect to the handle.

This cutter is much lighter in weight and much less expensive than an ordinary scythe and yet will be more effective in use for cutting heavy weeds and briers.

I claim:

1. A cutter of the character described, comprising a handle having a blade extending laterally from an end thereof, approximately at an obtuse angle to said handle, means for securing said blade to the handle, and an approximately straight auxiliary blade extending between the first-mentioned blade and the handle and being secured to both at the ends of said auxiliary blade, the point of securing of the auxiliary blade to the first-mentioned blade being intermediate the free end of said first-mentioned blade and the fastening means thereof for bracing said first-mentioned blade.

2. A cutter of the character described, comprising a handle having an approximately straight blade extending laterally from an end of the handle approximately at an obtuse angle thereto, means for securing said blade to the handle, and an approximately straight auxiliary blade extending between intermediate portions of the handle and first-mentioned blade and rigidly secured to both at the opposite ends of said auxiliary blade, said blades having edges beveled off respectively in opposite directions providing cutting edges approximately in alignment with each other.

3. A cutter of the character described, comprising an elongated handle having an approximately straight cutter on one side thereof and extending at an angle of approximately 105° from an end thereof, a plate at the opposite side of the handle from the cutter, bolts extending through the cutter, handle and plate for securing the cutter to the handle, and an auxiliary cutter extending from an intermediate portion of the first-mentioned cutter to an intermediate portion of the handle and rigidly secured to both at the opposite ends of said auxiliary cutter.

THOMAS J. STUMP.